US006815915B2

(12) United States Patent
Hellstroem

(10) Patent No.: US 6,815,915 B2
(45) Date of Patent: Nov. 9, 2004

(54) DEVICE SYSTEM FOR MULTIPLE MOTORS

(75) Inventor: Jerker Hellstroem, Brandsbovaegen (SE)

(73) Assignee: Aros Electronics AB, Moelndal (SE)

( * ) Notice: Subject to any disclaimer, the term of this patent is extended or adjusted under 35 U.S.C. 154(b) by 0 days.

(21) Appl. No.: 10/643,008

(22) Filed: Aug. 18, 2003

(65) Prior Publication Data

US 2004/0095087 A1 May 20, 2004

Related U.S. Application Data

(63) Continuation of application No. PCT/EP02/01741, filed on Feb. 19, 2002.

(30) Foreign Application Priority Data

Feb. 19, 2001 (SE) .............................. 0100584

(51) Int. Cl.$^7$ ................................. H02P 7/80
(52) U.S. Cl. ..................... 318/34; 318/625; 318/41; 318/49; 318/112; 307/31; 307/34
(58) Field of Search ........................ 318/34, 625, 41, 318/49, 112; 307/31, 34

(56) References Cited

U.S. PATENT DOCUMENTS

| | | | | |
|---|---|---|---|---|
| 5,113,123 A | * | 5/1992 | Noser et al. ................. 318/106 |
| 5,150,020 A | * | 9/1992 | Ueda et al. .................... 318/87 |
| 5,166,582 A | * | 11/1992 | Jaeger et al. .................. 318/45 |
| 5,229,650 A | * | 7/1993 | Kita et al. ..................... 307/66 |
| 5,982,156 A | * | 11/1999 | Weimer et al. ............. 323/222 |
| 6,153,949 A | | 11/2000 | Soderhall |

FOREIGN PATENT DOCUMENTS

WO    WO 99/52193    10/1999

* cited by examiner

Primary Examiner—Rina Duda
(74) Attorney, Agent, or Firm—Flynn, Thiel, Boutell & Tanis, P.C.

(57) ABSTRACT

A device for supplying energy by means of a first DC voltage source e.g. in the form of a DC voltage bus, a drive system comprising several electric motors is connected to said DC voltage bus. The electric motors are comprised e.g. in a number of yarn feeding devices co-acting with a weft insertion system in a shuttleless weaving machine for producing a woven fabric having a multi-colour pattern. The electric motors operate with energy consumption function phases (start and acceleration) and with energy generating function phases (deceleration or braking). The first DC voltage source is associated with at least one second DC voltage source via a variable voltage converter. During operation of the electric motors DC voltage and/or current parameters are detected and used to control the voltage converter to produce an energy flow from the first to the second DC voltage sources during an energy generation function phase, or from the second to the first DC voltages sources during an energy consumption function phase. By said energy flows an evening-out of the voltage variations at the first DC voltage source is achieved. The second DC voltage source comprises capacitors defining an active energy buffer.

10 Claims, 1 Drawing Sheet

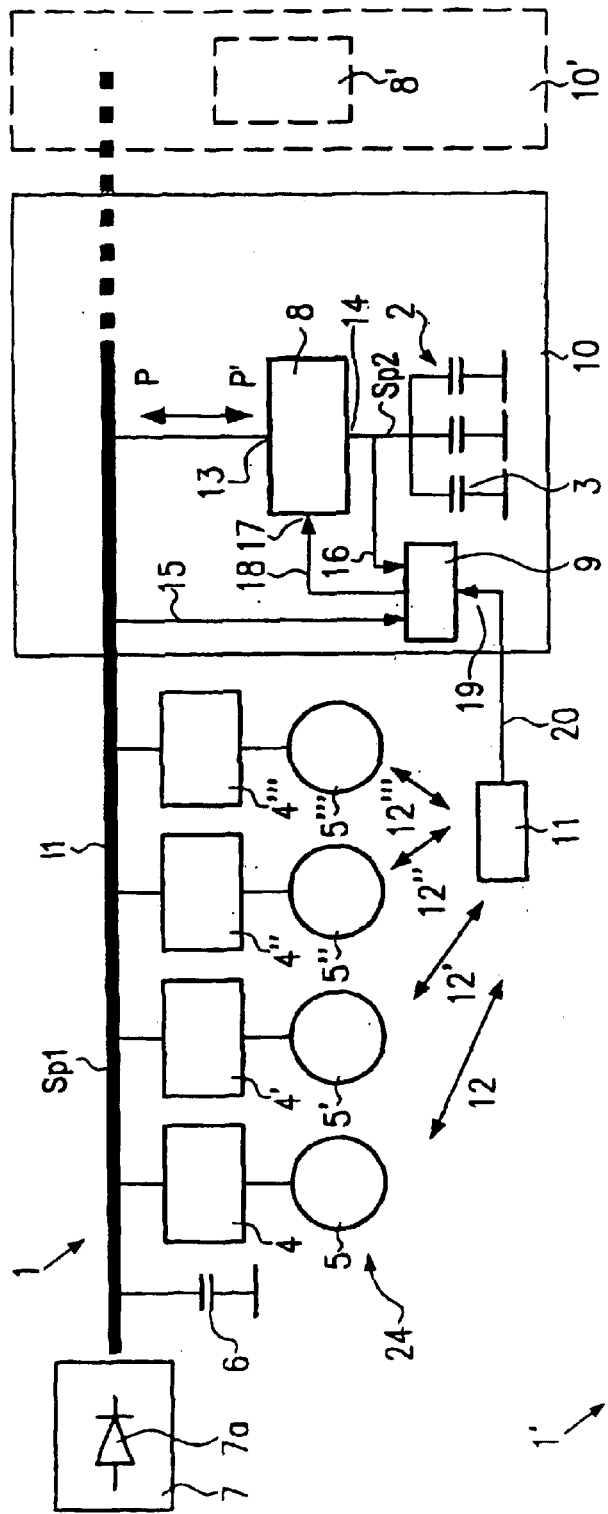
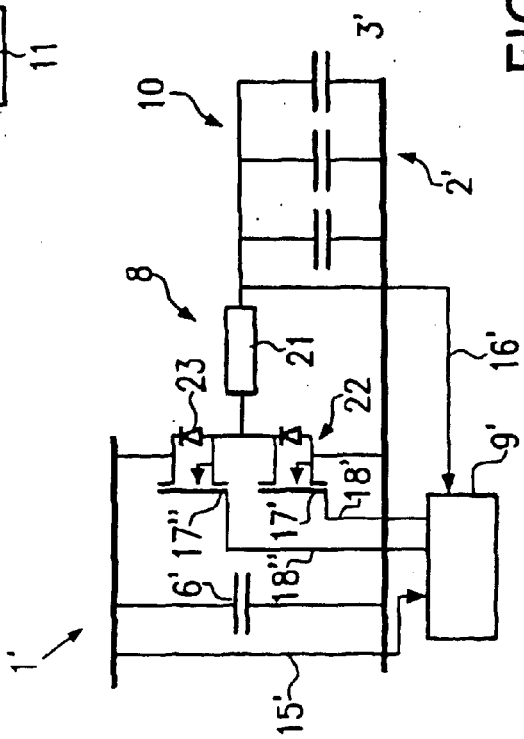
FIG. 1
FIG. 2

DEVICE SYSTEM FOR MULTIPLE MOTORS

This Application is a continuation of PCT/EP020/01741, filed Feb. 19, 2002

FIELD OF THE INVENTION

The present invention is used in a device for supplying energy by means of a first DC voltage source to one or several drive systems which comprise several electric motors and which are connected to the first DC voltage, said motors being in energy-consumption respective energy generation function phases during their operation, whereby said phases e.g. can have a varying appearance. As a suitable example of a drive case a device can be mentioned which comprises a plurality of yarn feeding devices, so-called "fournisseurs", each of which being equipped with its own drive motor, said yarn feeders co-acting with the weft yarn insertion system in a shuttleless weaving machine for feeding the weft yarn into the machine for producing a woven fabric having a multi-colour pattern.

BACKGROUND OF THE INVENTION

In many cases of operating electric motors a great part of the "work" consists in energy consuming acceleration and energy generating deceleration. The useful generated energy can be relatively small, but occurring top effects can nonetheless be significant. In cases of severe deceleration during a long period of time, e.g. several minutes, a known but complicated solution is to feed the energy generated back to the mains. Examples of such cases are the braking of rollers in the paper industry, in wire drawing or metal sheet drawing plants.

Another type of cases is where the input and output effects are high but the duration is so short that the respective energy amounts remain moderate. Examples of such cases are industry robots and yarn feeding devices for weaving machines, so-called weft feeding devices.

It is also known in cases with low top effects, which occur with short durations, to directly store the generated brake energy in capacitors and to later use it for accelerating and driving the electric motors in the drive system in question.

A very common method for taking care of the generated brake energy in electric motors is to convert it into heat, e.g. through over-magnetisation of the motors or through utilisation of brake resistors.

Furthermore, it is possible to achieve a certain voltage evening out effect by means of the capacitors that normally exist in the DC intermediate net section, to which the controls of the electric motors are connected.

One problem, when feeding back brake energy to the mains, is the fact that the motor braking function disappears at a current-failure. Therefore, such systems often are completed by brake resistors or by mechanical brakes. The principle of directly storing brake energy in capacitors and the use of the stored brake energy at a later moment for acceleration and drive of the electric motors in the system has been economically advantageous only for small top effects in practical cases up to now, up to some 100 Watts. When there are several electric motors in a drive system, there is often one common power supply part to the electric motors, for example a so-called DC intermediate section. Input effects respective generated brake effects can in these cases amount to values from some 100 Watts, as for example in a case with a system of yarn feeding devices, up to several tens of kW in other examples of drive cases. Up to now, when using the known capacitor arrangements, this has caused problems and it has become necessary to apply the above-mentioned methods of converting the braking energy into heat by over-magnetisation and/or by brake resistors. However, the then occurring heat development is causing big disadvantages. If the heat is to be taken up in the electric motors, those often have to by over-dimensioned.

As basic requirements, and in order to secure good functions of several electric motors and motor controls commonly connected to a first voltage source, and particularly for electronic components of moderate price, a relatively stable supply voltage is usually needed. In earlier known devices this requirement is limiting the amount of energy which practically is possible to be stored in co-action with evening-out effects, achieved by capacitors, which evening-out effects are occurring in the DC feed sections to which the motor controls are connected. To maintain a relatively stable supply voltage the amount of storable energy is relatively limited.

Thus, there exists a demand to be able to save electric energy, to avoid heat developments and to decrease input top effects into the drive system. It is the primary object of the present invention to solve the problem complex mentioned above. Furthermore, it is desirable to build a drive system in the form of a modular system, e.g. with several storing places, and to design the device such that it is possible to store a considerable amount of energy even if available space is limited, i.e. avoiding big size, expensive capacitors, and to nevertheless maintain the supply voltage relatively stable such that moderate price electronic components can be used which otherwise were damaged by severe voltage variations.

WO 99/52193 discloses a power controller of a distributed generation power networking system including a common DC-voltage bus and several interlinked energy components and a power generating or power consuming turbine as a primary energy source. A respective bi-directional power converter is provided between each energy component including the turbine and the DC-voltage bus such that each energy component communicates with the DC-voltage bus in either direction exclusively via the associated power converter. The power controller constituting a common power converter control unit controls the way in which each energy component, at any moment, will sink or source power, and the manner in which the DC-voltage bus is regulated. The various energy components include energy sources, loads, storage devices and combinations thereof. One storage device is designed as a ultracap conventionally containing at least one capacitor. The bi-directional power converters of all participating energy components are needed for achieving the compatibility between the various energy components. The power networking system is a closed system without any connection to a permanent DC-voltage supply system.

U.S. Pat. No. 6,153,949 A is related to an electrical power management system of a radio communication device. Power provided by a main power supply is supplied by a DC-DC step up converter in a first operational state to a load and simultaneously for energy storing to a capacitor. In another operational state where the load momentarily requires more power than can be provided by the power supply the energy stored in the capacitor is provided to the converter to use the stored energy. In the second operational state, the system is disconnected from the power supply.

SUMMARY OF THE INVENTION

The invention is mainly characterised in that the common DC-voltage bus is associated with at least one DC-voltage energy storing buffer via a controlled variable voltage converter, which in dependence of detections of one or more DC-voltage and/or DC-current parameters occurring during the operation of the electric motors brings about precisely defined energy flows from the DC-voltage bus into the DC-voltage energy storing buffer during energy generation function phases and from the DC-voltage energy storing buffer to the DC-voltage but during energy consumption function phases of the electric motors. Further features consist of the fact the controlled energy flows bring about an evening out of the DC-voltage variations in the DC-voltage bus and for the respective electric motors, i.e. and extreme advantageous voltage stability allowing to implement fair cost electronic components like effect transistors, in the device and the electric motors as well as in the electric motor control, which components otherwise are vulnerable to severe voltage variations, and in that the DC-voltage energy storing buffer is design to constitute and active storing buffer for DC-energy. The storing buffer is built of or comprises relatively small sized or only few capacitors for the storing function. Particularly peak energy loads, which might damage sensitive electronic components, are evened out by causing a respective, precisely control energy flow. Both important advantages (small voltage variations in the DC-voltage bus, only few capacitance needed for storing considerable energy amount) are achieved by the variable voltage converter accurately controlling the respective energy flows in direction and rates strictly depending from the actual voltage less current states. The variable voltage converter may be a controlled, bi-directional, switched mode DC/DC-voltage converter. The electric motors are supplied with DC-voltage predominantly via the rectifying component and from the common external power source. The device is completed by the active DC-voltage energy storing buffer secondarily for evening out otherwise occurring significant DC-voltage variations in the DC-voltage bus during energy consumption function phases and/or energy generation function phases of the electric motors. That is, the energy amount sourced into the DC-voltage during an energy generating function phase of at least one of the electric motors which otherwise caused a significant DC-voltage variation in the DC-voltage is directed into the DC-voltage energy storing buffer to avoid the undesirable DC-voltage variation in the DC voltage bus. Moreover, during a energy consumption function phase of at least one of the electric motors a measured energy amount is directed into the DC-voltage energy storing buffer to avoid another DC-voltage variation in the DC-voltage still supplied with the DC power from the common DC power unit in order to suppress a significant DC-voltage variation. The device constitutes an open system permanently supplied with DC power from the common DC power unit with an internal active DC-voltage energy storing buffer employed for evening out DC-voltage variation for the electric motors allowing to use fair cost electronic components in the motor controls and the electric motors which electronic components otherwise would suffer from drastic DC-voltage variations. Since the electric motors directly and in parallel are connected to the DC-voltage bus the electric motors are able to electrically communicate with the DC-voltage bus in completely unobstructed fashion avoiding undesirable energy losses and enhancing a direct and immediate response behaviour of each electric motor to control commands.

In one embodiment the variable voltage converter is connected to the DC voltage bus associated with the first DC voltage source to which DC voltage bus said electric motors commonly are connected or can be connected via their motor controls. The variable voltage converter is also connected to the second DC voltage source. A control unit may be connected for sensing parameter information related to voltage/current from the DC voltage bus and the second DC voltage source. Said information also can be related to "target value" respective "actual value" of direction and/or amount or rate of the energy flows between the DC voltage sources. In one embodiment the control unit mentioned furthermore can be arranged such that it is controllable from a superior control system, e.g. a first control system, which is controlling the electric motors in question. Alternatively, the control unit mentioned can be controllable from a second control system which is communicating with the first control system mentioned.

During the energy variations that occur when one or several motors are driven in the system, an energy transmission is taking place between the first and the second DC voltage source, for example at deceleration, and vice versa e.g. at the start or acceleration of the motor/motors. Furthermore, the second DC voltage source can be arranged to be recharged before start of one or more of the electric motors. Such a recharge can be done from a separate DC current source or a separate DC current net. In a preferred embodiment, the DC voltage level in the first DC voltage source is kept at an essentially constant value, e.g. a value that has an accuracy of ±10% of the nominal value of the DC voltage. The second DC voltage source, on the other hand, works with a strongly varying DC voltage level, which e.g. can vary within a range of between 60–310 V. The capacitors comprised in the second DC voltage source are arranged to become charged and discharged essentially in a maximum way by said energy flows. The capacitors operate with a set operation energy charge level which is lower than the possible maximum charge level, e.g. is set about 75%, such that the capacitors are able to further store energy even if the set charge level has been reached, and to further discharge energy when the charge level has already dropped to the set charge level.

The electric motors can for example be comprised in yarn feeders, industrial robots and/or textile machines. Examples of application of the invention in a textile machine can be the case of a jacquard weaving machine for producing a pattern fabric, which machine has a first electric motor ("main motor") for driving the weaving machine itself, in preferably a conventional way, and a second electric motor (separate) driving the jacquard mechanism ("jacquard motor"), alternatively a number of small electric motors that corresponds to the number of warp yarns/harness wires, whereby each such small motor is arranged to be responsible for raising/lowering of its respective warp yarn, via its corresponding harness wire, for achieving the formation of a shed system which would generate the desired pattern during the weaving process. The first electric motor ("main motor") and the second electric motor ("jacquard motor"), alternatively the first electric motor ("main motor") and said small electric motors ("harness motors"), form in each of these two alternative cases the drive system with which the device according tot he invention is arranged to co-act for achieving energy evening-out. A further, third alternative in the case of a jacquard weaving machine could be that only the (great number of) "harness motors" (small motors) may form the drive system (of motors) with which the device according to the invention is arranged to co-act for achieving energy evening-out.

The variable voltage converter comprised in the system according to the invention may comprise an inductance, transformer or corresponding component which is connected to the first voltage source via effect transistors, the control input ports of which are connected to the control unit mentioned above, which in dependence of the DC current and/or the DC voltage parameters actuate respectively de-actuate the transistors for controlling the directions and/or amounts of the energy flows between the first and the second DC voltage sources in switched modii. The electric motors may, advantageously, comprise or consist of PM (permanent magnet) motors having high efficiency.

With a solution according to the one proposed above, it will be possible to re-use the stored brake energy from the electric motors at a later moment and to thereby be able to save energy and to decrease energy losses in the form of heat in the system. Furthermore, by using the stored brake energy for the acceleration of the electric motors, the amount of energy taken from the power supply can be decreased, which means that the power supply can be made smaller. The advantages of using capacitors are essential, since the energy content in the capacitors is a square function of the voltage variations, which means that one can use the capacitors in practice as a buffer within a relatively very large range. The use of e.g. several other DC voltage sources makes it possible to further increase the level of the energy stored in the capacitors. A wider use of PM motors having high efficiency and small size, in which it is difficult to burn away the brake energy in the motor/motors, have become possible due to the invention. Relatively inexpensive effect transistors e.g. in the electric motors, and high energy prices makes the solution according to the invention especially interesting to use in practice.

BRIEF DESCRIPTION OF THE DRAWINGS

Embodiments of the invention are shown in the drawing, where

FIG. 1 in schematic, principle form, illustrates a first embodiment of a device according to the invention, and FIG. 2 in schematic, principle form, illustrates a modified detail of the device of FIG. 1.

DETAILED DESCRIPTION

In FIG. 1, a first DC voltage source comprises a DC voltage bus 1 and a second DC voltage source comprises an energy storing buffer 2 with capacitors 3. Several electric motors 5, 5', 5", 5"', commonly are connected to the DC voltage bus 1, via motor controls 4, 4', 4", 4"'. A filter capacitor 6 and a DC voltage supply unit 7, e.g. in the form of or comprising a rectifying function 7a, also are connected to the DC voltage bus 1.

Between the first and the second DC voltage sources 1 and 2 a variable voltage converter is arranged, which in the present case is switched mode controlled by a control unit 9. The voltage converter controls alternating energy flows P and P' in both directions between the first and second DC voltage sources 1, 2.

The first DC voltage source 1, 7, with its filter capacitor 6, motor controls and electric motors can be considered as an energy consumption place, and the second DC voltage source with its storing buffer 2, the switched mode controlled variable DC/DC voltage converter 8 and at least control unit 9 can be considered as a storing place for energy, which is indicated within a frame 10. The storing place 10 can be considered to work as an active energy buffer.

As indicated in dotted lines in FIG. 1 there may be one or more additional storing places 10' each connected via its own voltage converter 8' and other necessary, above-mentioned equipment to the DC voltage bus 1.

In a more advanced control system, the control unit 9 is controlled from a superior control system 11. The superior control system may have a separate control function or may even co-act with the control system of the electric motors 5, 5', 52, 5"', which co-action is indicated by arrows 12, 12', 12", 12"'.

The first DC voltage source or the DC voltage bus 1 works with a DC voltage Sp1 which is maintained essentially constant, because during deceleration of one or more electric motors in the device, the brake energy generated is moved from the consumption place to the storing place, and during acceleration of one or more electric motors energy is moved from the storing place to the consumption place. The second DC voltage source works with a DC voltage Sp2 which may vary within wide limits. The control unit 9 senses the actual voltage values of the first and second DC voltage sources via connections 15 and 16. The control unit 9 brings about a switched mode control on the control input port 17 of the voltage converter 8 via a control conductor 18. The superior control system, if provided, controls the control unit 9 at its control input port 19 via control conductor 20.

The capacitors 3 operate with a set or target operation energy charge level which is lower than the maximum charge level, e.g. is set about 75%. In one embodiment of the invention a pre-charging of the capacitors 3 in the storing place 10 can be made, even a pre-charging higher than the target level, possibly by a separate voltage source which is not especially shown here, before the electric motors are allowed to start, where upon that stored energy can be used at the start of the electric motors, which energy use is decreasing the effect take-out from or partly is relieving the power supply 7, 7a. The dimensioning and capability of the power supply can thus be decreased, because of the prior charging of the capacitors 3 and because internally generated energy is stored and re-used within the device even during normal operation after the starting phase.

In its simplest embodiment the device according to the invention, the control unit 9 collects information about the voltage levels Sp1 and Sp2, which information is used to determine how the energy flow P, P' shall be moved between the first and second voltage sources 1 and 2 by switched mode control of the variable voltage converter 8 (direction and rate or amount of the respective energy flow). If, for example, the voltage Sp1 tends to raise rapidly due to the fact that at least one electric motor decelerates, charging of the capacitors 3 of the second DC voltage source takes place by an energy flow P'. If, on the other hand, the voltage Sp1 tends to fall quickly or the current consumption increases during acceleration of at least one of the DC electric motors, the capacitors 3 in the second DC voltage source 2 are discharged and the energy flow P is controlled to the first DC voltage source.

In a more sophisticated device according to the invention the information about desired direction of the energy flow P or P' and its amount or rate can be obtained from a superior control system. By the term superior control system is meant e.g. the control system which controls the electric motors or a control system communicating with the control system controlling the electric motors.

In an even more sophisticated device according to the invention information also can be collected about the current E1 on the DC voltage bus 1, e.g., if it is intended to keep the voltage level Sp1 even more constant (and not to wait for a triggering voltage drop before e.g. the energy storing buffers delivers energy).

With the variable voltage converter between the first and the second DC voltage surfaces and its switched mode operation it is possible to vary the voltage over the capacitors 3 considerably. Due to the fact that the respective energy content of the capacitors 3 depends on a square function of voltage variations, a buffer function is achieved within a relatively wide energy range. In preferred embodiment the capacitors are charged with brake energy generated by at least one of the electric motors with the consequence that this stored energy can be used at a later moment to drive or accelerate at least one other or, alternatively, the very same electric motor in the device. Thus, the energy buffer evens out any flow of energy over time, i.e. maintains voltage variations at the DC voltage bus 1 low with the help of the controlled voltage converter, which functions as a bi-directional energy flow gateway. The energy buffer needs relatively small sized or relatively few capacitors because the influence of the variable voltage converter allows to run the device with relatively little capacitance.

In FIG. 2 at least one inductance 21 is provided as voltage converting element between the first and second DC voltage sources 1' and 2'. The second voltage source 2' comprises capacitors 3'. A control unit 9' senses actual voltage values on the DC voltage bus 1' and in the second DC voltage source 2' via connections 15' and 16'. For switched mode control there are two effect transistors 22, 23, the control inputs 17', 17" of which are controlled from the control unit 9' via control conductors 18', 18". By actuating one of the transistors with control signals of the control unit 9, the energy flows can be controlled in direction and rate between the first and the second DC voltage sources 1', 2'. The capacitors 3' are charged via the transistor 23'. Via the transistor 22 the capacitors 3' are discharged. Using the inductance 21 allows to discharge against a higher voltage. Also in this case, a filter capacitor 6' is provided.

As the electric motors 5, 5', 5", 5'", permanent magnet (PM) motors advantageously can be used. In one embodiment the electric motors can be drive motors of yarn feeding devices (fournisseurs) for weaving machines. The nominal supply voltage Sp1 can e.g. be chosen to be 190 Volts. During a motor deceleration, there can e.g. be an energy storing demand of approximately 75 Joules. The accelerations and decelerations can have a duration of about 400 ms. In accordance with the invention, the active energy buffer can work with voltage variations in the second voltage source 2' within a range between 50 V and 300 V over the capacitors 3. 3'. This means in this case that only a capacitance of approximately 1750 F will be necessary.

This embodiment can be compared with a conventional solution according to the state of art, where only directly charged and discharged capacitors are used. If in this case e.g. a 30% voltage ripple occurs, not less than a capacitance in the order 7100 F would be needed. Such a considerable capacitance demand not only means a technically uncomfortable solution, but also the space for the capacitors of this solution would be unreasonably large and it would not fit into the device. The proposed embodiment according to the invention can also be compared with a conventional case in which brake resistors and power supply means of higher capacity are utilised. The brake resistors and the stronger power supply means will have the consequence that the components need to be over-dimensioned resulting in considerably higher costs.

In FIG. 1 a drive system is symbolised with 24. One or more such corresponding drive systems can be connected to the first DC voltage source 1' as well.

A core of the invention is to provide at least one DC bus associated to an energy buffer comprising an intelligent and active switched mode controlled voltage converter in co-action with several electric motors commonly connected to the voltage bus. The voltage converter's influence and the energy buffer considerably even out voltage bus voltage variations, suppress high energy peaks which are dangerous for certain electric components in the device, assist in saving energy by a controlled re-direction of stored braking energy, and totally reduce the power demand of the device with moderate storing capacitance only.

What is claimed is:

1. An energy supplying device for a group of electric motors alternately operating with energy consumption function phases represented by motor start and motor acceleration function phases and energy generation function phases represented by motor stop or motor deceleration function phases, including a common DC-voltage bus which is connected to the electric motors and via a bi-directional variable voltage converter to at least one active DC-voltage energy storing buffer having at least one capacitor, a voltage converter control unit inserted between the DC-voltage bus and the DC-voltage energy storing buffer for selectively controlling respective energy flows between the DC-voltage bus and the DC-voltage energy storing buffer to either transmit energy from the DC-voltage energy storing buffer into the DC-voltage bus during an energy consumption function phase or transmit energy from the DC-voltage bus to the DC-voltage energy storing buffer during an energy generation function phase of at least one of the electric motors, respectively, wherein all said electric motors are connected in parallel via separate motor controls directly to the DC-voltage bus, wherein the DC-voltage bus is connected via a rectifying function component to a DC-voltage supply unit for supplying DC-voltage via the DC-voltage bus to each of the electric motors at least in the energy consumption function phases, and wherein the voltage converter control unit is arranged for detecting varying DC-voltage and/or current parameters at the DC-voltage bus and at the DC-voltage energy storing buffer, respectively, and to control the voltage converter to direct a respective voltage energy flow into the DC-voltage bus or into the DC-voltage energy storing buffer in order to even out voltage variations in the DC-voltage bus between set predetermined voltage variation limits by determining the direction and/or amount of the respective voltage energy flow in dependence from the detected voltage and/or current parameters the predetermined voltage variation limits of the DC-voltage bus defining a significantly narrower range than a range of voltage variations allowed at the DC-voltage energy storing buffer.

2. The device as in claim 1, wherein the control unit is connected to a first control system controlling the electric motors of the motor group, or a second control system communicating with the first control system.

3. The device as in claim 1, wherein the DC-voltage bus is connected with two or more of said DC-voltage energy storing buffers via a corresponding said variable voltage converter for each said DC-voltage energy storing buffer.

4. The device as in claim 1, wherein the DC-voltage energy storing buffer is controlled by the control unit to operate with a predetermined operation energy charge level lower than a possible maximum energy charge level.

5. The device as in claim 4, wherein the DC-voltage energy storing buffer is chargeable from the exterior to the predetermined operation energy charge level.

6. The device as in claim 1, wherein the limits for the DC-voltage bus voltage variations define a range of about ±10% of nominal DC-voltage of the DC-voltage bus as provided by the rectifying function component.

7. The device as in claim 1, wherein the range of voltage variations of the DC-voltage energy storing buffer is between 50 V and 300 V.

8. The device as in claim 1, wherein the electric motors are high efficiency permanent magnet motors.

9. The device as in claim 1, wherein the electric motors are provided in yarn feeders of a yarn feeding system, or in a weaving machine, or in one or several industrial robots.

10. The device as in claim 1, wherein the variable voltage converter comprises at least one inductance connected via two effect transistors to the DC-voltage bus, wherein control inputs of both said effect transistors are connected to the converter control unit for selectively directing a respective DC-voltage energy flow into the DC-voltage bus or into the DC-voltage energy storing buffer, and wherein the converter control unit is connected via a parameter conductor to the DC-voltage bus and via a parameter conductor to a DC-voltage energy storing buffer conductor extending between the inductance and the at least one capacitor, and wherein the capacitor and the effect transistors are connected to ground, and wherein a filter capacitor is provided parallel to both said effect transistors between the DC-voltage bus and ground.

* * * * *